June 10, 1952        J. J. ROOT        2,599,783
MOTOR SPEED CONTROL APPARATUS
Filed Nov. 13, 1948
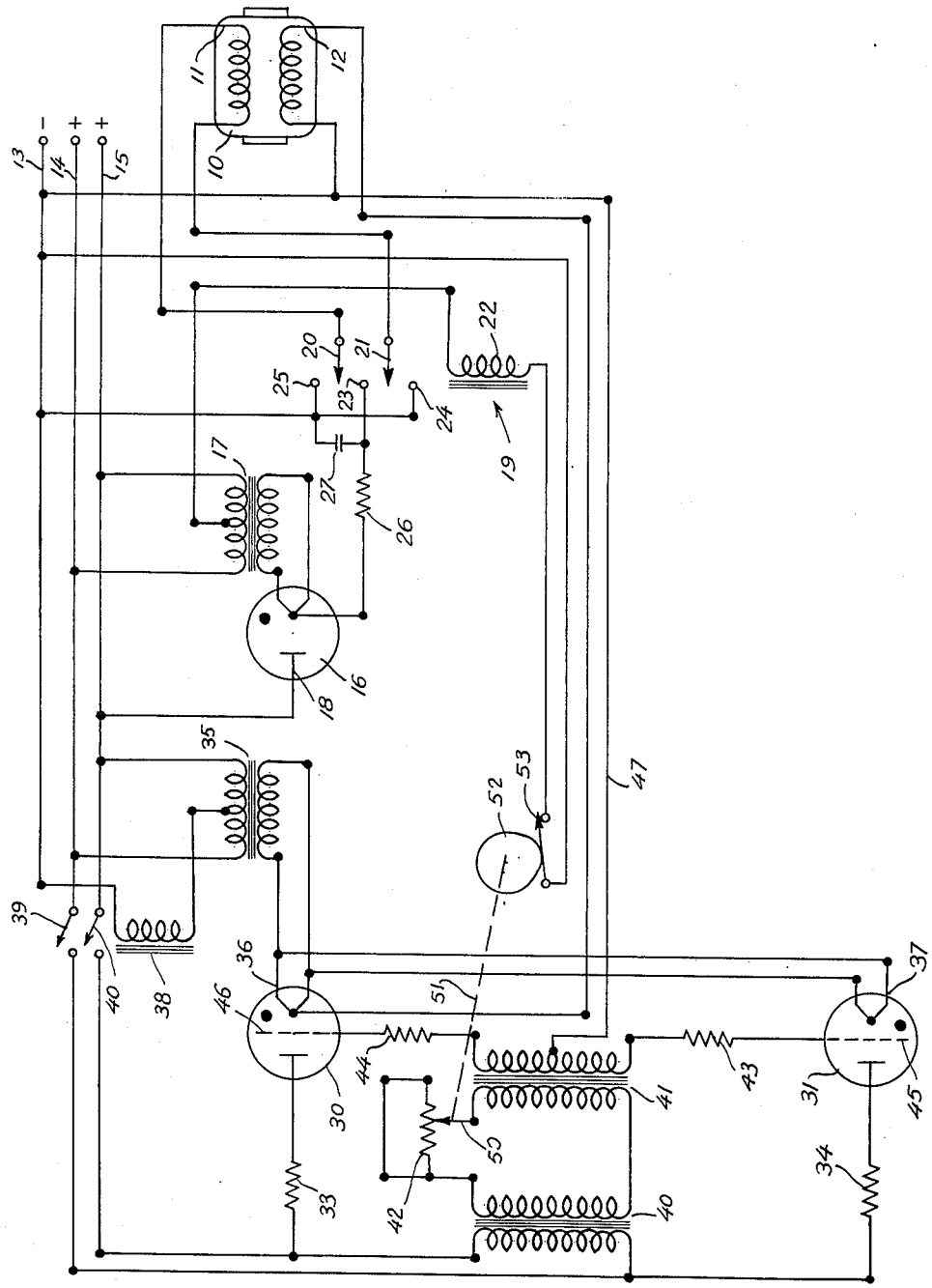
INVENTOR.
John J. Root
BY S. Stephen Baker
ATTORNEY Patented June 10, 1952

2,599,783

UNITED STATES PATENT OFFICE 2,599,783

MOTOR SPEED CONTROL APPARATUS

John J. Root, New York, N. Y.

Application November 13, 1948, Serial No. 59,799

3 Claims. (Cl. 318—257)

1

This invention relates to speed control of electric motors and more particularly to a means for maintaining the speed of an electric motor constant under varying load conditions.

According to the present invention, the counterelectromotive potential developed by operating a direct current motor is utilized to control the voltage supplied to such motor in such a manner as to provide constant speed characteristics under varying loads. In this manner, the armature is supplied with a voltage which varies inversely with the load. Gas discharge tubes, such as thyratrons, are employed in a rectifier arrangement and provide the armature voltage, the armature being included in the cathode circuit of such gas discharge tubes. The armature is coupled into the biasing circuit for the gas discharge tubes of the rectifier so that any fluctuation in the voltage appearing across the armature due to a varying load will affect the bias of the rectifier so as to compensate for the fluctuation by adjusting the armature voltage accordingly.

The invention further provides a reversing relay tied in with the manually operated speed control circuit and which operates to change the motor direction by reversing the direction of the field.

The invention, including the objects thereof, will be further understood from the following detailed description and drawings.

The single figure is a schematic diagram illustrating the circuit employed in practicing the instant invention.

The motor 10 is of the direct current type having a field winding 11 and an armature winding 12. The motor is energized through the three phase power lines 13, 14 and 15. In the form shown, the field rectifier comprises the tube 16 which may be a type C1JA thyratron rectifier or the like. Power lines 14 and 15 supply the filament voltage through transformer 17, the power line 15 being applied to plate 18. In this manner, the voltage is rectified and applied through relay 19 to the motor field 11.

Relay 19, through operation which will hereinafter be described, effects the reversal of the motor by reversing the polarity of the field 11. Thus, when relay arms 20 and 21 are actuated by the relay winding 22 so as to effect contact with terminals 23 and 24, the motor will turn in one direction, whereas if connection to terminals 23 and 25 is effected, it will turn in the reverse direction. Resistance 26 is the usual current limiting resistor while condenser 27 serves as a direct current blocking condenser.

2

The armature rectifier employs two grid controlled tubes 30 and 31. This may take the form of C3J grid control thyratrons or the like. The plate voltage applied to these tubes is taken from the lines 14 and 15 of the three-phase power source. Thus, the power is derived from rectifying two of the phases against a third phase in what may be referred to as a two phase rectifier. However, it will be recognized that a single phase alternating current source may be utilized and, if desired, transformers may be employed to supply such plate voltages. Resistances 33 and 34 are the usual current limiting resistances as used in gas discharge tubes of the thyratron type.

The filament voltage supply transformer 35 supplies the energizing voltage for filaments 36 and 37 and is arranged to supply such voltage when relay 38 is suitably energized. Relay 38 is a time delay relay wherein the arms 39 and 40 are not actuated until an adjustable time delay of approximately 1-2 minutes has elapsed. This prevents the application of plate voltages to the tubes 30 and 31 before the filaments are heated as is more or less conventional.

Transformers 40 and 41 and potentiometer 42 comprise the manual control circuit for adjusting the desired speed of the motor. Potentiometer 42 may be remotely located with respect to the motor. Tubes 30 and 31 are connected as a full wave rectifier of a type and capacity depending upon the horsepower of the motor to be controlled. As above stated, these may take the form of grid controlled thyratrons, the resistances 43 and 44 serving as current limiting resistors for the grids 45 and 46 respectively. If a half horsepower motor or the like is used, these resistances may take the form of high wattage heater elements.

Potentiometer 42 is connected as a dual rheostat in that the setting of its arm 50 divides the potentiometer impedance element into two branches which control the motor speed in either direction of rotation as hereinafter described.

Initial adjustment of potentiometer 42 sets the desired speed of the motor and, since it may be remotely located, is in series with the low voltage legs of the double transformer arrangement comprising transformers 40 and 41. The secondary of transformer 41 is connected to one side of the motor armature winding in effectuating, together with the joint cathode connection, to the other side, the supply of rectified voltage to the armature winding. The secondary of transformer 41 is further used to apply the initial, predetermined bias to the grids 45 and 46. To this initial bias is added a voltage derived from wire 47 which voltage depends upon the operating speed of the motor since it represents a counterelectromotive voltage.

Thus, the motor can be made to maintain a constant speed because a varying load thereon will create a correspondingly varying counterelectromotive force and will alter the initial bias of the full wave armature rectifier. This is arranged to be a regenerative action. That is, the greater the load, the greater will be the voltage supplied to the motor. In this way, the speed will remain constant for a given speed setting of potentiometer 42 regardless of the load on the motor. It will be recognized, therefore, that by incorporating the motor armature in the cathode or output circuit so as to be energized thereby and by applying the counterelectromotive force through substantially the same connection to the input control circuit so as to alter the bias of the rectifier supplying the armature, the speed of the motor may be maintained constant under varying loads.

Arm 50 is provided with a mechanical tie or arm 51 so that it is ganged to a cam 52. Cam 52 operates as a reversing switch in conjunction with switch arm 53 in that the high point of the cam depresses arm 53 and energizes relay winding 22 so as to reverse the polarity of the motor field 11. The mechanical connection 51 brings the high portion of the cam into circuit closing position when the potentiometer arm 50 passes the center point of the potentiometer impedance element over which the arm 50 travels in varying the effective resistance or impedance of the potentiometer. Thus, the speed of the motor can be controlled in either direction of operation.

While there has been described what at present is considered a preferred embodiment of the invention, it will be evident that many changes and modifications may be made therein without departing from its spirit. For example, the armature 12 may be incorporated in the plate circuit of an armature rectifier tube as above disclosed and its counterelectromotive potential may be applied to the grid through a transformer after rectification. It has been found that such method is suitable although slightly more expensive in that an additional rectifier is required. It is therefore aimed in the appended claims to cover all such changes and modifications which fall within the true spirit and scope of the invention.

What is claimed is:

1. Motor speed control apparatus comprising a pair of grid controlled vacuum tubes connected as a full wave rectifier, the cathodes of the tubes being joined, means to connect the armature of a motor into the joint cathode circuit so as to supply a direct current to the armature, a manual control for the grid of said tubes whereby the output voltage of the rectifier may be initially adjusted so as to predetermine the operating speed of the motor, and a connection from said grid for connecting the armature thereto for varying the voltage of said grid according to the operating speed of the motor, said manual control comprising a double transformer arrangement between the plates and grids of the armature rectifier tubes, said transformer arrangement including two primary windings, two series connected low voltage legs, and a potentiometer connected in series with said low voltage legs.

2. Apparatus according to claim 1 and including a reversing relay having contacts connectable from said field rectifier to the motor field, operation or non-operation of said relay determining the motor rotation direction, a reversing switch for closing the circuit of said relay, and a cam ganged to the arm of said potentiometer for closing said reversing switch, the ganged connection being such that the reversing action takes place at approximately a mid-point position of the potentiometer arm on the potentiometer impedance element.

3. Motor speed control apparatus comprising a grid controlled rectifier tube and circuit therefor for applying a direct current voltage from the output thereof to the armature of a motor, a manual control for varying the output voltage of the rectifier tube so as to control the speed of the motor accordingly, means to connect the armature of the motor to the grid of said rectifier tube so as to vary the grid voltage according to the operating speed of the motor, and a second rectifier for supplying a direct current voltage to the field of the motor, said manual control comprising a transformer operative to feed an initial biasing voltage to said grid, said transformer arrangement including a low voltage leg, a potentiometer electrically connected to said low voltage leg, and a relay having contacts connectable into the circuit of said second rectifier for reversing the direction of the motor, and means for energizing said relay through the operation of said potentiometer.

JOHN J. ROOT.

REFERENCES CITED

The following references are of record in the file of this patent:

UNITED STATES PATENTS

| Number | Name | Date |
|---|---|---|
| 842,515 | Baehr | Jan. 29, 1907 |
| 2,082,496 | Howe | June 1, 1937 |
| 2,297,719 | Satterlee | Oct. 6, 1942 |
| 2,352,626 | Grabau | July 4, 1944 |
| 2,422,567 | Puchlowski | June 17, 1947 |
| 2,459,340 | Reeves | Jan. 18, 1949 |